(12) United States Patent
Maisey et al.

(10) Patent No.: US 11,493,289 B1
(45) Date of Patent: Nov. 8, 2022

(54) WETTABLE MEDIA AND METHOD OF MAKING THE SAME

(71) Applicants: Grahame Ernest Maisey, Wyncote, PA (US); Beverly Milestone, Wyncote, PA (US)

(72) Inventors: Grahame Ernest Maisey, Wyncote, PA (US); Beverly Milestone, Wyncote, PA (US)

( * ) Notice: Subject to any disclaimer, the term of this patent is extended or adjusted under 35 U.S.C. 154(b) by 0 days.

(21) Appl. No.: 17/561,044

(22) Filed: Dec. 23, 2021

Related U.S. Application Data

(60) Provisional application No. 63/196,934, filed on Jun. 4, 2021.

(51) Int. Cl.
| | |
|---|---|
| *F24F 6/04* | (2006.01) |
| *F28F 21/06* | (2006.01) |
| *F28C 3/06* | (2006.01) |
| *B33Y 80/00* | (2015.01) |
| *F24D 19/00* | (2006.01) |
| *F24F 3/14* | (2006.01) |
| *B01J 19/32* | (2006.01) |

(52) U.S. Cl.
CPC ............. *F28F 21/065* (2013.01); *F24F 6/04* (2013.01); *F28C 3/06* (2013.01); *F28F 21/067* (2013.01); *B01J 19/32* (2013.01); *B33Y 80/00* (2014.12); *F24D 19/0082* (2013.01); *F24F 3/1411* (2013.01); *F24F 2003/144* (2013.01); *F24F 2003/1435* (2013.01)

(58) Field of Classification Search
CPC ........................................................ F24F 6/04
See application file for complete search history.

(56) References Cited

U.S. PATENT DOCUMENTS

| | | | |
|---|---|---|---|
| 3,792,841 A | 2/1974 | Munters | |
| 5,211,891 A | 5/1993 | Anoszko | |
| 7,021,078 B2 | 4/2006 | Kucera | |
| 2003/0150234 A1* | 8/2003 | Ohmi | F28C 1/04 62/309 |
| 2010/0003431 A1 | 1/2010 | Raybuck | |
| 2017/0321913 A1 | 11/2017 | Dinnage | |
| 2019/0120509 A1 | 4/2019 | Seeley | |

FOREIGN PATENT DOCUMENTS

| | | | |
|---|---|---|---|
| FI | 64460 B | * | 7/1983 |
| RU | 2742852 C1 | * | 2/2021 |

* cited by examiner

*Primary Examiner* — Robert A Hopkins
(74) *Attorney, Agent, or Firm* — Riverside Law LLP

(57) ABSTRACT

A wettable media pad comprises an inlet side and an outlet side and a porous structure made from a non-woven material, comprising a plurality channels having a hexagonal cross-section defined by six walls, the channels running from the inlet side to the outlet side, wherein the wettable media pad is configured to direct fluid from a top surface of the media pad to a bottom surface of the media pad along at least one of the walls of the channels, wherein the wettable media pad is configured to exchange heat and mass between a fluid positioned on or in a wall of the channels and a gas flowing through the channels as the gas flows from the inlet side to the outlet side, and wherein the wettable media pad is produced with additive manufacturing. A method of making a wettable media pad is also described.

17 Claims, 9 Drawing Sheets

WETTABLE MEDIA AND METHOD OF MAKING THE SAME

CROSS-REFERENCE TO RELATED APPLICATIONS

This application claims priority to U.S. Provisional Patent Application No. 63/196,934, filed on Jun. 4, 2021, incorporated herein by reference in its entirety.

FIELD OF THE INVENTION

This invention relates to wettable media used for processing units, for example liquid desiccant air conditioning units, as well as other applications that use wetted media with a liquid to exchange energy with air or another gas.

BACKGROUND OF THE INVENTION

Media used to provide a wetted surface for the flow of liquid to exchange heat and or mass with a gas has been in use for many years. One application in which such media is used is in a liquid desiccant or other liquid air conditioning system, where the media is generally manufactured either from paper (cellulose) that has been welded or bonded into shape, as in Munters media or Kuul, as examples, or some other hydrophilic material. Other suitable applications include evaporative condensers, cooling towers, or any system that has a liquid and a gas flowing through it for energy exchange, chemical exchange, for example filtration, purification, or adding or removing chemicals from the gas.

Some existing media is made of woven material, such as a fiber, e.g. cotton, wool or hemp, or nonwoven material such as paper, plastic or glass. Some media comprise composite materials such as a polymer composite or web materials, such as thermoplastic continuous web. Some existing material is wettable so as to allow a fluid to pass through the material. Some material is also configured to have a non-smooth finish so that it causes a turbulence on contact with the air or gas.

Such media pads may be wetted with a liquid desiccant solution or other liquid and positioned so that an air or gas is moved through the pad(s) to perform one or more tasks to condition the air or gas. Existing media pads are generally constructed to be rigid in form, and are generally arranged to be in combination. In some existing configurations, a bank of media pads may be as large as 8 m high by 20 m wide by 20 m deep (25 feet high×60 feet wide×60 feet deep) or as small as 5 cm high by 5 cm wide by 5 cm deep (2 inches×2 inches×2 inches). Larger pad arrangements have been generally constructed of pads 1 m high×0.3 m wide× 0.3 m deep (3 feet high×1 foot wide×1 foot deep) stacked together. Transporting or shipping these larger media pads can require a significant effort and space due to their size.

Additionally, existing media pads generally comprise several sheets formed into undulating surfaces and then welded or glued or otherwise bonded together to form one piece or a pad. This glued, welded or bonded area reduces the usable wetted surface area for liquid saturation along the weld, glue or bond lines. Existing media have glue, weld or bond lines so that the holes that allow for air flow through the wetted media need to be slanted to drain the liquid over and away from the glue, weld or bond lines. The glue, weld or bond lines also restrict the shape the holes can be.

No existing media allow for compression during shipment, or can be configured with custom hole sizes or different convolutions of holes, configurable to maximize energy transfer, filtration, purification, or chemical exchange, in different sizes and configurations of air conditioning unit or other heat transfer or gas transfer process units. No existing media can be produced without wasteful glue, weld, or bond lines.

Further details about existing media for air conditioning systems may be found in U.S. Pat. Nos. 9,377,207, issued on Jun. 28, 2016; 9,302,922, issued on Apr. 5, 2015; 9,086,223, issued on Jul. 21, 2015; 8,800,308, issued on Aug. 12, 2014; 8,769,971, issued on Jul. 8, 2014; 6,568,662, issued on May 27, 2003; 6,409,157, issued on Jun. 25, 2002; 5,242,627, issued on Sep. 7, 1993; 5,143,658, issued on Sep. 1, 1992; 4,139,584, issued on Feb. 13, 1979; and 3,792,841, issued on Feb. 19, 1974, all of which are incorporated herein by reference in their entireties.

Reference is also made to U.S. Patent Application Publication Nos. 2019/0120509, published Apr. 25, 2019; 2006/0292349, published Dec. 28, 2006; and 2004/0237781, published Jan. 9, 2007, all of which are incorporated herein by reference in their entireties.

Thus, there is a need in the art for media that may be optimized such that every cubic centimeter has optimum surface area, allowing for more energy transfer and maximum heat transfer and more and deeper filtration and purification can occur in less space. There is also a need in the art for media pads that can be compressible for easy shipment and handling, while being able to revert to their full size with no or negligible damage or loss of function. Finally, there is a need in the art for media that can be produced with a non-slanting overall shape that will still allow for unimpeded draining of liquid. The disclosed devices and methods satisfy these needs.

SUMMARY OF THE INVENTION

In one aspect, a wettable media pad comprises an inlet side and an outlet side and a porous structure made from a non-woven material, comprising a plurality channels having a hexagonal cross-section defined by six walls, the channels running from the inlet side to the outlet side, wherein the wettable media pad is configured to direct fluid from a top surface of the media pad to a bottom surface of the media pad along at least one of the walls of the channels, wherein the wettable media pad is configured to exchange heat and mass between a fluid positioned on or in at least one of the walls of the channels and a gas flowing through the channels as the gas flows from the inlet side to the outlet side of the media pad, and wherein the wettable media pad is produced with additive manufacturing.

In one embodiment, at least one surface of the media pad comprises nanoparticles. In one embodiment, the wettable media pad is produced with no weld, bond, or glue lines. In one embodiment, the media pad is compressible and expandable. In one embodiment, the media pad is rigid. In one embodiment, the media pad further comprises at least one ribbon of a second material running from a first surface of the media pad to a second surface of the media pad, configured to stiffen the media pad along an axis defined by the ribbon. In one embodiment, the hexagonal cross-section has a shape of a regular hexagon. In one embodiment, the channel is arranged such that a corner of the regular hexagon cross-sectional shape is pointed toward the top surface of the media pad when in a vertical position.

In one embodiment, at least a portion of the wettable media pad is configured as tessellated regular hexagons. In one embodiment, the hexagonal cross-section has a shape of an irregular hexagon. In one embodiment, at least a portion of the wettable media pad is configured as tessellated irregular hexagons. In one embodiment, at least one channel of the plurality of channels runs parallel to the top surface of the media pad. In one embodiment, at least one channel of the plurality of channels is not parallel to the top surface of the media pad. In one embodiment, at least one channel of the plurality of channels is structured with an undulation along an axis as the at least one channel runs from the inlet side to the outlet side. In one embodiment, the walls have a same thickness. In one embodiment, at least one of the walls has a thickness that is different from a thickness of at least one other wall of the six walls. In one embodiment, at least two of the six walls have a thickness that is different from at least one other wall of the six walls.

In one aspect, a method of making a wettable media pad comprises forming at least one channel in the wettable media pad, using an additive manufacturing technique with a wettable, non-woven material, forming a top surface and a bottom surface, and building the wettable media pad with no weld, bond, or glue lines. In one embodiment, the at least one channel has a hexagonal shape. In one embodiment, the at least one channel runs parallel to the top surface. In one embodiment, the at least one channel includes at least one undulation.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION

Figure 1:
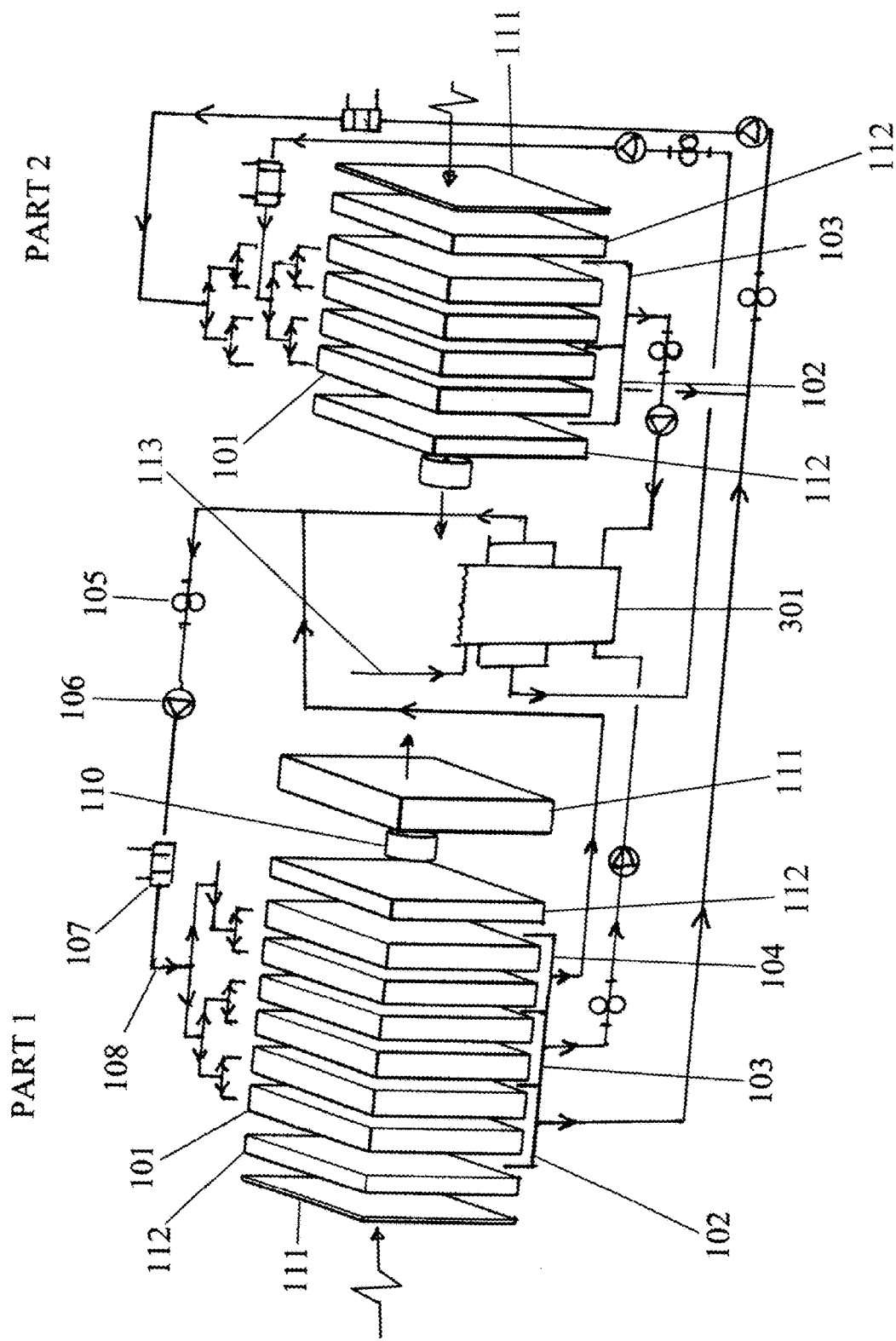
FIG. 1 is an exemplary liquid desiccant air conditioning system having a plurality of media pads.

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Some aspects of the present invention may be made using an additive manufacturing (AM) process. Among the most common forms of additive manufacturing are the various techniques that fall under the umbrella of "3D Printing", including but not limited to stereolithography (SLA), digital light processing (DLP), fused deposition modelling (FDM), selective laser sintering (SLS), selective laser melting (SLM), electronic beam melting (EBM), and laminated object manufacturing (LOM). In some embodiments, an AM process as disclosed herein may include deposition of nanoparticles on a surface of part or all of an object. These methods variously "build" a three-dimensional physical model of a part, one layer at a time. AM also makes possible the manufacture of three-dimensional unitary structures of parts, for example with features that conventional manufacturing techniques (for example gluing or welding) are unable to create.

Suitable materials for use in AM processes include, but are not limited to, using materials including but not limited to cellulose, paper, paper blend, and the like. In some embodiments, a material used in an AM process as disclosed may be any wettable material, or any material that allows fluid to pass through it. In some embodiments, the material used may include nanoparticles. In some embodiments, an AM process may comprise building a three dimensional physical model from a single material, while in other embodiments, a single AM process may be configured to build the three dimensional physical model from more than one material at the same time. In some embodiments, a component manufactured with an AM process may be manufactured with one or more intentionally rough surfaces, arrived at either by not applying a typical finishing step to smooth an outer surface (for example sanding, cutting, or buffing) or by intentionally 3D printing a component with one or more rough outer surfaces.

In various embodiments, nanoparticles of a material may be deposited on or as part of one or more surfaces of a device as disclosed herein. Deposited nanoparticles may be configured to alter one or more properties of a device as disclosed herein, for example to stiffen or provide structural reinforcement to all or part of a device, to extend the usable life of a device, to facilitate better heat and/or mass transfer, for example by changing thermal conductivity, to increase or reduce turbulence, to change electrical conductivity, to enhance thermal or chemical resistance, etc. Nanoparticles as contemplated herein may include individual particles with a diameter between 1 nm and 100 nm, or between 1 nm and 500 nm. Nanoparticles used in the disclosed devices and methods may comprise various materials, including but not limited to ceramic, carbon-based, metals, semiconductors, polymeric, or lipid-based materials.

In some embodiments, one or more surfaces of a device as disclosed herein may comprise quasiparticles. Quasiparticles are an emergent phenomenon that occurs in a solid. The principal motivation for quasiparticles is that it is almost impossible to directly describe every particle in a macroscopic system. For example, consider an exemplary barely-visible (0.1 mm) grain of sand contains on the order of $10^{18}$ nuclei and electrons. Each of these attracts or repels every other by Coulomb's law. In principle, the Schrödinger equation predicts exactly how this system will behave. But the Schrödinger equation in this case is a partial differential equation (PDE) on a $3 \times 10^{18}$ dimensional vector space—one dimension for each coordinate (x,y,z) of each particle. Directly and straightforwardly trying to solve such a PDE is impossible in practice. Solving a PDE on a 2-dimensional space is typically much harder than solving a PDE on a 1-dimensional space (whether analytically or numerically); solving a PDE on a 3-dimensional space is significantly harder still; and thus solving a PDE on a $3 \times 10^{18}$ dimensional space is quite impossible by straightforward methods.

One simplifying factor is that the system as a whole, like any quantum system, has a ground state and various excited states with higher and higher energy above the ground state. In many contexts, only the "low-lying" excited states, with energy reasonably close to the ground state, are relevant. This occurs because of the Boltzmann distribution, which implies that very-high-energy thermal fluctuations are unlikely to occur at any given temperature.

Quasiparticles and collective excitations are a type of low-lying excited state. For example, a crystal at absolute zero is in the ground state, but if one phonon is added to the crystal (in other words, if the crystal is made to vibrate slightly at a particular frequency) then the crystal is now in a low-lying excited state. The single phonon is called an elementary excitation. More generally, low-lying excited states may contain any number of elementary excitations (for example, many phonons, along with other quasiparticles and collective excitations).

When the material is characterized as having "several elementary excitations", this statement presupposes that the different excitations can be combined. In other words, it presupposes that the excitations can coexist simultaneously and independently. This is never exactly true. For example, a solid with two identical phonons does not have exactly twice the excitation energy of a solid with just one phonon, because the crystal vibration is slightly anharmonic. However, in many materials, the elementary excitations are very close to being independent. Therefore, as a starting point, they are treated as free, independent entities, and then corrections are included via interactions between the elementary excitations, such as "phonon-phonon scattering".

Therefore, using quasiparticles/collective excitations, instead of analyzing $10^{18}$ particles, one needs to deal with only a handful of somewhat-independent elementary excitations. It is, therefore, a very effective approach to simplify the many-body problem in quantum mechanics.

Throughout the disclosure, one or more embodiments of devices and methods may be presented through the use of illustrative examples, for example as part of a cooling device, air processing device, air conditioning unit, or liquid desiccant air conditioning unit. It is understood that these illustrative examples are not meant to be limiting on the disclosed devices and methods, and serve merely to present exemplary applications of the devices and methods (for example, media pads and methods of making and using media pads) disclosed herein. For example, it is understood that any aspect of the disclosure presented via an illustrative example as part of a liquid desiccant air conditioning system could apply equally to any air or gas processing unit. As used herein, the terms "processing unit" or "gas processing unit" refer to any system that facilitates energy exchange, chemical exchange, or filtering between a liquid and a gas.

Similarly, various exemplary embodiments may be presented as employing particular liquids, for example liquid desiccant or brine, and/or particular gases, for example air. It is understood that these examples are not meant to be limiting, and that the devices and methods disclosed herein may be used in conjunction with any liquids or gases.

Liquid Desiccant Air Conditioning Systems

Aspects of the invention relate to liquid desiccant air conditioning systems. In accordance with one or more embodiments, such a system is scalable in size and is adaptable and flexible. Systems airflow sizes with paper or other material media pads may be from 5 L/s (liters per second) to 50,000 L/s with single height media pads, giving the system the ability to be easily produced in both large sizes for commercial, institutional and industrial use and in small sizes for residential and single room applications. A system may be a stand-alone HVAC unit or be the treatment section for the outside air for a larger HVAC unit. A system may be increased in size by stacking sections or having sections adjacent one another where specified.

In accordance with one or more embodiments, an air conditioning system may have an air stream that may be 100% outside air or a proportion of recirculated air from the space served together with outside air, or 100% recirculated air from the space or process served. The air may be humidity and temperature controlled, and filtered, purified, and sterilized to some degree by contact with media pads or other absorbent material wetted with a liquid desiccant of appropriate concentration and temperature. If the air entering the unit is more humid than desired, the air may be dehumidified by contact with media pad or pads wetted with liquid desiccant. The concentration of the desiccant supplied to the device in some embodiments influences the humidity content of the conditioned air exiting from the unit. Passing an external cooling fluid through the liquid/liquid heat exchanger cools the liquid desiccant and through that the air by contact with the media pads wetted with the cooled desiccant.

In accordance with one or more embodiments, in winter air may be heated and humidified by contact with one or more media pads wetted with liquid desiccant that has been appropriately diluted. Passing an external warming fluid through the liquid/liquid heat exchanger warms the liquid desiccant and through that the air by contact with media pads wetted with the warmed desiccant. Thus, in all seasons the air humidity and temperature may be controlled independently by supplying the conditioner unit with a suitable heating or cooling fluid and a suitable desiccant concentration. Energy recovered from the exhaust air stream or other source may minimize the cooling and warming fluid required as well as the humidification fluid and dehumidification required. If energy recovery is not possible then heat recovery via a run-around coil system or other systems may be used.

In accordance with one or more embodiments, one or more preheating and/or precooling coils may be added to or removed from either or both the conditioner unit and the energy recovery/regenerator unit at any time.

In accordance with one or more embodiments, there may be a pre-warming or pre-cooling coil in the conditioner unit where condensate recovery is important or where energy recovery from the exhaust air is not possible and where only heat and cooling recovery is possible through a coil in the exhaust air. If there is no recovery possible from the exhaust air, the coil may remain to provide pre-conditioning to the conditioner unit.

In some embodiments, an air washer or preconditioner may be used in one or both of the conditioner unit or the energy recovery/regenerator unit. Further details about exemplary air washers suitable for use with the devices disclosed herein may be found in U.S. Pat. No. 10,760,797, issued Sep. 1, 2020, incorporated herein by reference in its entirety.

In accordance with one or more embodiments, a separate heat/cool recovery coil system may be used where the exhaust air is contaminated or physically not available for desiccant energy recovery or regeneration. The heat/cool coil may be used for preheating the liquid desiccant or as a run around coil system with a coil before the media pads in the conditioner unit.

In accordance with one or more embodiments, post heating and or post cooling coil or coils may be added to or removed from either or both the conditioner unit and the energy recovery/regenerator unit at any time.

In accordance with one or more embodiments, a pre filter is an option on either or both the conditioner unit and the energy recovery/regenerator unit.

In accordance with one or more embodiments, a post filter is an option on either or both the conditioner unit and the energy recovery/regenerator unit.

In accordance with one or more embodiments, an appropriate increase in concentration of the liquid desiccant when required may be accomplished by the energy recovery/regenerator unit that is configured similarly to the conditioner unit, or optionally have a counter flow arrangement where the airflow is vertically upward and the desiccant flow is vertically downward, but used to evaporate water from the desiccant or recover energy from the exhaust air stream or other appropriate air supply. Thus, the conditioner unit and the energy recovery/regenerator unit may be essentially the same in construction but are used in different modes. Since the exhaust air is typically lower in volume than the supply air because of losses due to other exhaust fans where the air cannot be economically collected, the energy recovery/regenerator unit may be smaller and use less than the airflow of the conditioner unit. The exhaust air may be heated using the external warming fluid passed through a coil on the incoming air to the energy recovery/regenerator unit and/or through the liquid/liquid heat exchangers warming the liquid desiccant.

In accordance with one or more embodiments, there may be more than one conditioner unit going to each energy recovery/regenerator unit.

In accordance with one or more embodiments, there may be more than one energy recovery/regenerator unit for each conditioner unit.

In accordance with one or more embodiments, both the conditioner unit and the energy recovery/regenerator unit may be flexible and adaptable in construction. The media pads may be divided into sections such as the energy recovery section and the desiccant recirculation section of the conditioner unit and the energy recovery/regenerator unit and the desiccant recirculation section of the conditioner unit as well as the sections that are storage or flow to storage sections. In some embodiments, media pads may be custom engineered for a particular application and the number used in each unit may be varied to suit the climate and other operating requirements. The number and depth of media pads may be varied according to how much conditioning the supply air requires at design outside air conditions and other operating requirements. The media pad or pads may vary in height, width and spacing depending on design requirements. The depth of the media pads may also be split or divided so that not all of the media pads in any one system are the same.

In accordance with one or more embodiments, the system may be enclosed in a sealed but openable and accessible enclosure.

In accordance with one or more embodiments, the system may be housed in one enclosure or may be separated or split into two or more enclosures. Enclosures may be sealed but openable and accessible for maintenance or other purposes.

In accordance with one or more embodiments, a storage tank or tanks may be enclosed in a sealed but openable and accessible space some distance from either or both the conditioner unit and the energy recovery/regenerator unit or may be housed in a common enclosure with either or both the conditioner unit and the energy recovery/regenerator unit or may be included within the energy recovery/regenerator unit.

In accordance with one or more embodiments, airflow may be predominately horizontal through the conditioner unit and through the energy recovery/regenerator unit while the liquid desiccant may flow predominately vertically with gravity down the media pads thus the flow is cross flow.

In accordance with one or more embodiments the air flow may be S-shaped or snakelike, entering one end of one media pad and then entering through the opposite end of the next media pad, or the air flow may be C-shaped or U-shaped configuration, while passing predominately horizontally through the conditioner unit and or through the energy recovery/regenerator unit while the liquid desiccant may flow predominately vertically with gravity down the media pads thus the flow is cross flow.

In accordance with one or more embodiments, airflow may be predominantly vertical rising through the energy recovery/regenerator while the liquid desiccant may flow predominantly vertically downward with gravity down the media pads thus the flow in such embodiments is a counter flow.

In accordance with one or more embodiments, multiple media pads in the conditioner unit and in the energy recovery/regenerator unit may be installed adjacent to one another, separated by more or less than 2 centimeters. This feature allows one or more media pad in a single unit. The more media pads, the closer the system becomes to 100% contact and 100% efficiency in energy transfer as well as filtering, purifying and sterilizing the air. The multiple pad efficiency means that the system may operate on low temperature heat sources. The temperature differential between the outlet air temperature from the conditioner unit and the warming or cooling fluid temperature may be less than 1° C. The temperature differential between inlet air wet bulb on to the conditioner unit and the heating fluid temperature for the energy recovery/regenerator unit during high summer months may be less than 15° C. This allows the system to efficiently use clean, renewable energy sources such as raw ground heat exchange and inexpensive solar thermal panels thus helping to eliminate electric peak loads and electric refrigeration. Alternatively, the system may use the return water temperatures of chilled water systems where available, or absorption refrigeration machines, which may operate up to 3 times more efficiently at the higher cooling temperatures required by the disclosed system, and/or any low grade waste heat that is available.

In accordance with one or more embodiments, multiple media pads in both the conditioner unit and in the energy recovery/regenerator unit may be arranged sequentially, whether parallel to each other or in an S- or C- or U-shaped arrangement. As air flows through from one wetted media pad to the next, the liquid desiccant does less and less energy transfer, thus the used desiccant from the first pad or pads of the intake side will be either more saturated than the desiccant from later pads as when the air passing through is more humid, or more concentrated as when the air passing through is drier than the pads further away from the air intake end.

In accordance with one or more embodiments, the ability of the conditioner unit to filter, purify and sterilize the air enables the use of less mechanical filtration and thus may reduce the system fan power.

In accordance with one or more embodiments, the ability of the conditioner unit to condition up to 100% outside air that is warm and moist using the same high temperature cooling fluid and thereby avoiding the use of any more electricity during these high outside conditions helping to reduce summer peak loads.

In accordance with one or more embodiments, due to the ability to have a low frictional resistance through both the conditioner unit and through the energy recovery/regenerator unit for minimum fan power requirements, the only electricity required in most cases is for small pumps for pumping around the liquid desiccant and warming and cooling fluids and small fans to move the air in the conditioner supply air unit and the regenerator/energy recovery unit in the exhaust air system or the regenerator unit and exhaust recovery units.

In accordance with one or more embodiments, the system may employ low grade heat and cooling from renewable sources such that the system may require less than 1 kW of electricity during the high summer months to better accomplish over 100 kW of cooling and dehumidification of outside air.

In accordance with one or more embodiments, the liquid desiccant distribution system and spray system to the wetted media pads at the top of the pads and the collection of the liquid desiccant at the bottom of the pads is isolated from the air streams in the conditioner unit and may also be isolated in the energy recovery/regenerator unit where the airflow is predominantly horizontal. Sealing and isolating the liquid desiccant supply sprays and collection streams from the air stream together with low air velocities through the units helps eliminate the risk of micro droplets of the desiccant entering the air stream.

In accordance with one or more embodiments, the liquid desiccant in the conditioner unit may flow into one or more sumps. The desiccant from the media pads that have done the most energy transfer may flow into a sump that is then piped to the energy recovery/regenerator unit to be used as an energy recovery system whether the regenerator is being used or not. The desiccant from the next media pad or pads has done less energy transfer and may be piped directly into the storage tank or tanks or into the sump on the energy recovery/regenerator unit. The desiccant from the media pads closest to the conditioned supply airside of the conditioner unit has done the least amount of energy transfer and may be piped directly back into the piping system that flows back into the conditioner unit.

In accordance with one or more embodiments, the desiccant from the horizontal type energy recovery/regenerator unit may flow into one or more sumps. The desiccant from the media pads closest to the air entry side of the unit will have the most energy transfer/recovery and may be stored in the energy recovery/regenerator unit sump or may be piped directly into the storage tank or tanks. The desiccant from the media pads further from the air entry side of the unit may be recycled back into the energy recovery/regenerator unit for further energy transfer/recovery before flowing into the storage system.

In accordance with one or more embodiments, the desiccant from the storage tank or tanks may flow into the energy recovery/regenerator unit for further concentration or energy transfer/recovery.

In accordance with one or more embodiments, desiccant storage tank(s) or an energy recovery/regenerator sump may take any one of several forms, so long as the diluted and the concentrated desiccant are allowed to remain separated which they have a tendency to do when separated vertically by gravity. This may be achieved either by using two storage tanks and arranging appropriate flow between them or a single storage container may be used with the more dilute desiccant lying on top of the heavier, concentrated desiccant.

In accordance with one or more embodiments, a storage tank or tanks may be oversized or one of a number of tanks may be used as a standby tank during peak seasonal loads.

In accordance with one or more embodiments, distribution pipework to the multiple media pads in both the conditioner unit and the energy recovery/regenerator unit is an equal pressure/equal flow design such that it enhances equal liquid desiccant flow to the media pads even when the volume is varied and when there are more or fewer media pads. The equal distribution of the desiccant to the media pads, even under variable flows, enhances the performance of all the media pads and the performance during differing outside air conditions and winter and summer conditions. This achieves equal flow to the media pads throughout a range of flows from a pumping system during both summer and winter conditions. This pipework system will continue to provide equal flows to the media pads when one or more of the multiple media pads may be isolated. The distribution system allows the introduction of different width media pads that can be served equally by the distribution pipework.

In accordance with one or more embodiments, isolating, varying and integrating the volume flow of desiccant, the height of the media pad or pads, the width of the media pad or pads and the depth of the media pad or pads and the air speed through the system increases the efficiency of its operation throughout the yearly variances in outside weather. This is allowed by the equal pressure design of the supply distribution piping system together with the media pads and fan systems that may have variable capacities. Both the air volume and the desiccant volume may be varied through the media pads. The air speed may vary between 0.5 m/s (meters per second) to 3.5 m/s and the desiccant may vary from 0.3 L/s Liters per second) per square meter to 2.7 L/s per square meter media pad cross section. The height per media pad may vary from up to 3 m high as the highest single or multiple pads served by a single spray header each and the shortest single or multiple pads down to 0.15 m high. This allows the development of very small to very large size units with single or multiple height media pads, from 5 L/s to 50,000 L/s. Media pads may be removed individually for cleaning, rotating the pads or replacement at some time. Optimizing the fan power by varying the air volume is another feature that minimizes the system's electrical use.

In accordance with one or more embodiments, where the exhaust air or other source is not available for energy or heat recovery, an LDAC system may be comprised of a conditioner unit, regenerator unit and storage system.

Many construction variations can be embodied combining various elements mentioned. The present invention is in no way limited to a specific combination of said elements.

The advantages and features of the system may be better understood by reference to the following detailed description of illustrative embodiments and accompanying figures. It is to be understood that this invention is not limited to the specifics detailed therein as they describe a particular embodiment as an example only.

FIG. 1 is an exemplary illustration for an embodiment of the liquid desiccant air conditioning system invention. In this illustrative embodiment, the airstream enters at the supply side of the conditioner unit PART 1, and may pass through an optional filter 111 and then through an optional heating/cooling coil 112, which is connected to an external source to preheat or precool the air or to an energy recovery source from the energy recovery/regenerator unit PART 2. The air then passes sequentially over absorbent media pad or pads 101 that have been wetted with a specific concentration and temperature of a liquid desiccant for the desired (specified) amount of humidity and temperature required in the supply or process air. The supply or process air is cooled and dehumidified where necessary by cooling a concentrated liquid desiccant and heated and humidified where necessary by heating a diluted liquid desiccant. A heat exchanger 107 in the liquid desiccant piping will heat or cool the liquid desiccant using an external heat source or energy recovery source. The air is also being filtered, purified, and sterilized through contact with the liquid desiccant wetted media pads 101. The air then passes through an optional conditioning coil 112 through the fan 110 and then through an optional filter 111 and then exits at the opposite side to the entry side, the air being drawn through or pushed through the device by a fan 110 to a space or process served. The liquid desiccant piping 108 has optional strainers 105 to remove particulates from the desiccant and pumps 106 moving the desiccant through the supply pipework 108 to the sparge pipework 109 which supplies liquid desiccant to the media pads. The liquid desiccant flows down the media pads 101 and into either an optional energy recovery sump 102, a sump 103, or an optional desiccant recirculating sump 104. The liquid desiccant flowing into the energy recovery sump 102 flows through pipes to the media pads 101 in the energy recovery/regenerator unit PART 2 through which exhaust air or some other air source passes. There is an optional heat exchanger 107 in the liquid desiccant piping that will heat or cool the liquid desiccant using an external heat source or energy recovery source. The air in the energy recovery/regenerator unit PART 2 may first pass through a filter 111. The air may pass through an optional heating or cooling coil 112. An external heat source may be used or the exhaust air from the conditioned space/process or some other convenient useful source of airflow may be used as an energy recovery source. The energy recovery/regenerator will add moisture to the concentrated liquid desiccant or remove moisture from the diluted liquid desiccant. The air may then pass through an optional coil 112 to recover energy prior to exhausting. The air then exits to the opposite side from where it entered, drawn through or pushed through the device by a fan 110 to be exhausted to the outside. The now regenerated or energy recovered liquid desiccant goes into one or more storage tanks 301 where it is held in reserve or it may be stored in a sump 103 on the energy recovery/regenerator unit or it may be recirculated from the energy recovery/regenerator sump 102 back into the energy recovery/regenerator unit PART 2 for further energy recovery or regeneration. The liquid desiccant from the sump 103 is then piped into the storage tank 301 or forms a storage system of its own. The liquid desiccant from the recirculating sump 104 in the conditioner unit PART 1 is piped back to mix with the liquid desiccant from the storage system and flows back into the conditioner unit PART 1. In winter, or when more humidity is needed for the space or process, water is piped 113 into the liquid desiccant being held in the storage system. In summer, or when water is condensed or evaporated from the diluted liquid desiccant, it will be exhausted outside or optionally recovered and stored. The liquid desiccant in the storage system passes through an optional heat exchanger 107 that is attached to an external heating or cooling source to preheat or precool the liquid desiccant and then through the energy recovery/regenerator unit PART 2 before returning to the storage system 301 or sump 103 in the energy recovery/regenerator. The pipework shall have valves of appropriate size and type for isolation of parts and systems and control of fluids wherever necessary. There are controls for temperature, humidity, level and flow where appropriate.

Cold, dry air, when entering the conditioner unit PART 1, is warmed and absorbs moisture to a specified temperature and humidity level before it enters the space/process being served. Warm, moist air, when entering the conditioner unit PART 1, is cooled and dehumidified to a specified temperature and humidity level before entering the space/process being served. The air may be 100% outside air or may be mixed with recirculated air or may be 100% recirculated air. The ability of the conditioner unit PART 1 to filter, purify, and sterilize the air to a certain degree, enables the use of less mechanical filtration and thereby reduces the system pressure losses and fan power necessary to move the air, minimizing electrical use year round. The ability of the media pads 101 to condition the air and require fewer coils or eliminate coils reduces the system pressure losses and fan power necessary to move the air, minimizing electric power use year round.

The liquid desiccant is concentrated when it is required to dehumidify and diluted when required to humidify. In this illustrative embodiment, the liquid desiccant concentration level is controlled by a mechanism in the storage tank(s) 301 or energy recovery/regenerator unit sump 103 sensing the desiccant level to achieve the desired level and therefore concentration for the system mode of either dehumidification where the level may be lower, or humidification where the level may be higher. Other forms of the liquid desiccant concentration control are optional.

Low grade heat and cooling and very low amounts of electricity may be used even during the high summer months to provide cool, dry air to a space/process or during the high winter months to provide warm moist air. The only electricity required in most cases is for small pumps 106 for pumping around the liquid desiccant and warming and cooling fluids and fans 110 to move the air in the conditioner unit PART 1 and the regenerator/energy recovery unit PART 2 in the exhaust air system or the regenerator unit and exhaust units. The disclosed system has low frictional resistance through the units for minimum fan power requirements and is able operate on low temperature warming fluid for warming and dehumidification and high temperature cooling fluid for cooling and preheating together with energy or heat recovery systems and has the ability to filter, purify and sterilize the air passing through. The low grade heat and cooling sources may be such that clean, renewable sources may provide most of the heating and cooling, such as ground heat exchange for the cooling and prewarming and solar thermal for dehumidification and warming.

Systems airflow sizes may be from 5 L/s to 50,000 L/s with single height media pad sections, giving the system the ability to be easily produced in both large sizes for commercial, institutional and industrial use and in small sizes for residential and single room applications. Multiple media pad sections may increase the size of the system through stacking or adjacent sections. The system may be a stand-alone air unit or be the treatment section for the outside air for a larger HVAC (Heating, Ventilating and Air Conditioning) unit.

Figure 2A:
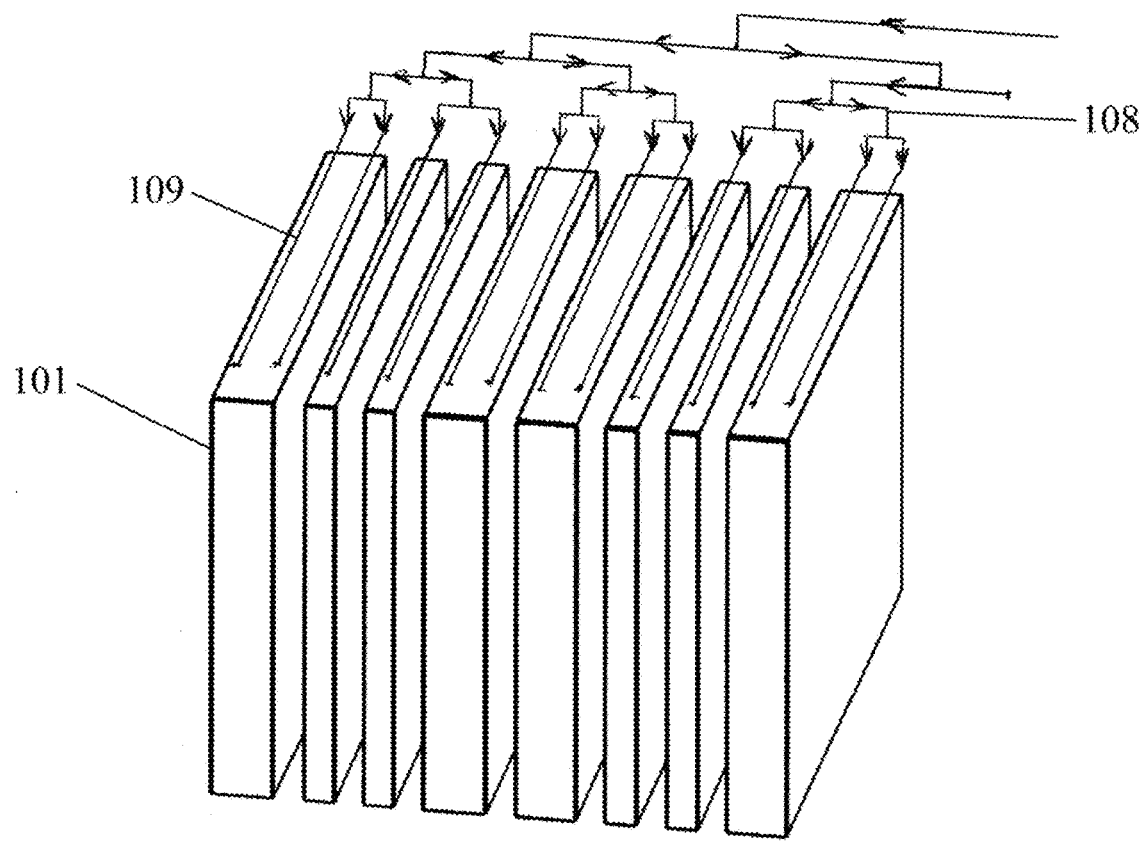
FIG. 2A is a partial view of a set of media pads in a liquid desiccant air conditioning system.
Figure 2B:
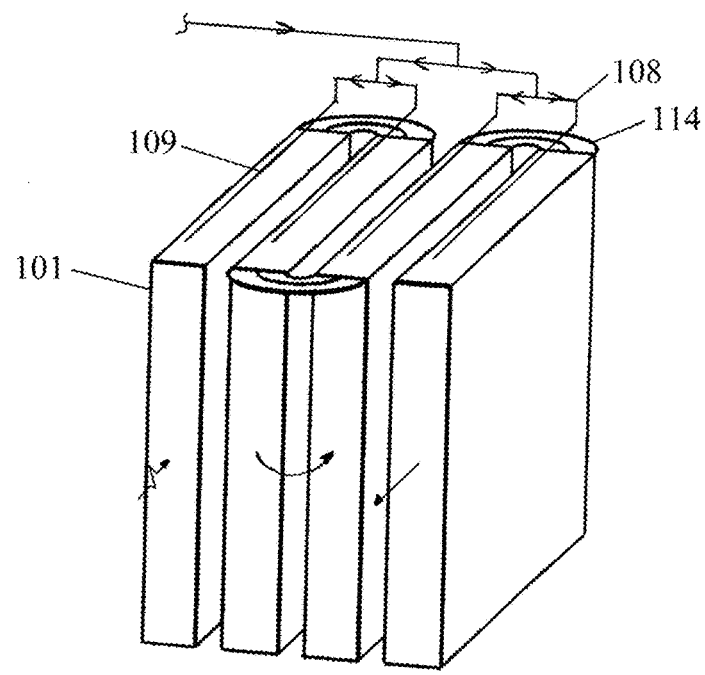
FIG. 2B is a partial view of a set of media pads in a liquid desiccant air conditioning system.

FIG. 2A and 2B depict an illustrative embodiment of an equal pressure/equal flow piping distribution 108 to the media pads 101 and the sparge piping desiccant delivery piping system 109. The piping 108 is designed such that there is always an equal flow of liquid desiccant to all the media pads 101 via the sparge pipes 109. The number and orientation of the media pads 101 may vary depending upon the requirements of the space/process to be served and the size of the system. Media pads 101 may be split when in a straight through system as embodied in FIG. 2A. The piping system 108 design is such that media pads may be added or removed at any time which may be for cleaning or seasonal changeover, and the sparge piping 109 to that pad or pads turned on or turned off and all the remaining media pads will receive equal flows of desiccant. The pumps 106 may be varied in volume or remain constant in volume.

In FIGS. 2A and 2B, the distribution pipework 108 to the multiple media pads 101 is an equal pressure/equal flow design such that it enhances equal liquid desiccant flow to the media pads even when the volume is varied and when there are more or fewer media pad sections. The equal distribution of the desiccant to the media pads, even under variable flows, enhances the performance of all the media pads and the performance during differing outside air conditions and winter and summer conditions. This achieves the equal flow to the media pads throughout a range of flows from a pumping system during both summer and winter conditions. This pipework system will continue to provide equal flows to the media pads when one or more of the multiple media sections may be isolated or added. The distribution system allows the introduction of different width media pads that can be served equally by the distribution pipework.

In FIGS. 2A and 2B the gravity flow of the liquid desiccant from the top of the pads to the bottom allows for minimal clogging while the liquid desiccant acts as an air filter. The desiccant does not enter the airstream but comes in contact with the wetted media pad or pads 101 and the air to exchange energy. The liquid desiccant piping distribution system 108 and spray sparge piping system 109 to the top of the media pads 101 and the collection of the liquid desiccant at the bottom of the media pads is isolated from the air stream in the conditioner unit and horizontal type energy recovery/regenerator unit. Sealing and isolating the liquid desiccant supply sprays and collection streams from the air stream together with sufficiently low air velocities through the units eliminates the risk of micro droplets of the desiccant entering the air stream.

Further details about Liquid Desiccant Air Conditioning Systems may be found in U.S. Pat. No. 9,631,824, issued Apr. 25, 2017 and incorporated herein by reference.

Figure 3:
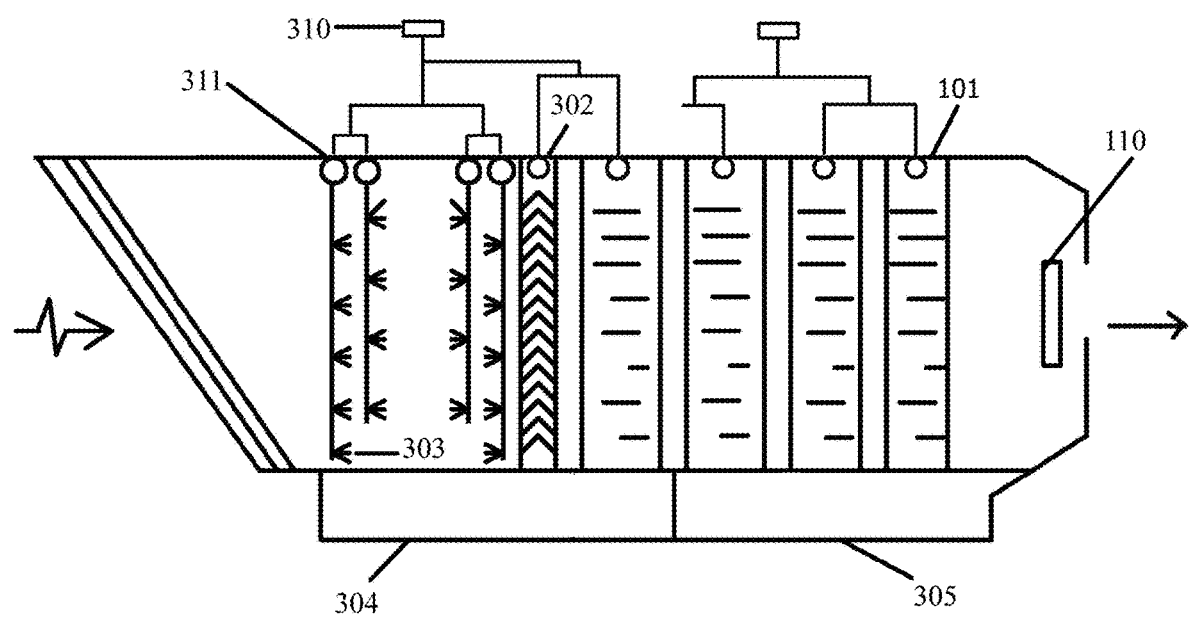
FIG. 3 is a partial view of an exemplary liquid desiccant air conditioning system with an air washer.

As discussed above, certain embodiments of processing units discussed herein may comprise an air washer or other preconditioner for example in the intake path. One exemplary embodiment of an air conditioner including an air washer is shown in FIG. 3. With reference to FIG. 3, an exemplary embodiment of a conditioner unit for a liquid desiccant air conditioning system is shown, with the air flowing horizontally left to right, driven by fan 110, and the liquid desiccant flowing vertically down. The spray washers 311 each have a plurality of spray nozzles 303, and are located at the air intake side of the conditioner unit prior to the eliminator 302 and the first media pad, membrane, or coil 101. The spray washers 311 may draw fluid for example from heat exchangers 310. The intake air is sprayed with water, fluid, or liquid desiccant by the nozzles 303 in the spray washers 311. This has the effect of trapping some of the particulate matter and pollution gases in droplets of either water, fluid, or liquid desiccant. Some of those droplets are carried downward by gravity into the sump 304, and others first flow with the intake air to the eliminator 302. A portion of the droplets that reach the eliminator 302 will condense on or be trapped by the eliminator 302, and will then flow or drip downward into sump 304. In one embodiment, the spray washers are fed by a pump with a separator or filtering element attached to the inlet, which pumps fluid, water, or liquid desiccant from sump 304. The spray washers 311 and the eliminator 302 can also act to condition the air by pre-cooling or pre-warming the air depending upon the temperature of the water, fluid, or liquid desiccant that is being sprayed. The spray washers 311 and the eliminator 302 can also act to condition the air by dehumidifying or humidifying the air depending upon the humidity of the air and the concentration of the water, fluid, or liquid desiccant or the temperature of the liquid that is being sprayed. The eliminator or eliminators 302 are located between the spray washers 311 and the first media pad, membrane, or coil 101. The one or more eliminators 302 remove droplets of the water, fluid, or liquid desiccant that were sprayed into the air by the spray washer 311, along with any contaminants trapped by those droplets. The eliminator 302 can also serve as a heat exchanger for cooling or warming the intake air.

As discussed above, one challenge facing large media pads or large numbers of media pads is transportation. Larger media pads, for example media pads measuring 2 meters×1 meter×1 meter, must be transported and installed as-is, leading to complicated logistics and added installation cost. The effort required to transport large media pads would be reduced if the larger media pads were compactable, collapsible or compressible and then expandable on site. In some embodiments, media pads made according to the disclosed methods and to the disclosed specifications may be compressible down to at most 50% of their uncompressed volume, at most 40% of their uncompressed volume, at most 30% of their uncompressed volume, at most 20% of their uncompressed volume, or at most 10% of their uncompressed volume, at most 5% of their uncompressed volume, or at most 2.5% of their uncompressed volume. In some embodiments, media pads as disclosed herein may be rigid, and may not compress significantly, or may compress for example to at least 97.5% of their uncompressed volume, at least 95% of their uncompressed volume, or at least 90% of their uncompressed volume.

Another challenge facing large or small media pads is efficiency of the pads capable of being produced with current manufacturing methods. Existing media pads are made with one uniform hole size or channel size, which may not be optimal for all configurations. The efficiency and effectiveness of media pads, particularly smaller pads, would be enhanced by designing the media to exhibit more surface area as the air passes.

In some embodiments disclosed herein, the size of the holes and the slant or undulation of the holes through the media pads and the depth of the media pads may vary and may for example be determined by computational fluid dynamics (CFD) calculations to increase the effectiveness of the media by providing significantly increased contact and efficiency of contact between the air or gas and the fluid for different sizes and configurations of processing units.

In some embodiments, using CFD or some other analytical design methodology, a media pad may be configured to perform at a specific flow rate (of either or both of fluid or gas). For example, in one embodiment, a media pad may be configured to have an air or gas flow rate of 100 ft$^3$ per minute to 700 ft$^3$ per minute, or 200 ft$^3$ per minute to 500 ft$^3$ per minute, or 600 ft$^3$ per minute to 800 ft$^3$ per minute, or 100 ft$^3$ per minute to 300 ft$^3$ per minute, or 400 ft$^3$ per minute to 500 ft$^3$ per minute. In some embodiments, a media pad may be configured to have a fluid flow rate through a surface of the pad of 0.1 gal/min/ft$^2$ to 3 gal/min/ft$^2$, or 0.1 gal/min/ft$^2$ to 1 gal/min/ft$^2$, or 2 gal/min/ft$^2$ to 3 gal/min/ft$^2$, or 1 gal/min/ft$^2$ to 2 gal/min/ft$^2$, or 0.1 gal/min/ft$^2$ to 0.5 gal/min/ft$^2$. In various embodiments, different flow rates of gas or fluid may be advantageous for different applications. In some embodiments, methods of manufacturing media pads as disclosed herein may comprise the step of determining a preferred rate of gas flow, determining a preferred rate of fluid flow, and constructing a custom media pad configured to achieve the closest point possible to both target flow rates. In one embodiment, a media pad as disclosed herein is configured to be fully flushable. In one embodiment, a media pad as disclosed herein is configured to minimize clogging.

Still another challenge relates to the inherent inefficiencies caused by glue, weld, or bond lines necessary to produce existing media pads. In some embodiments, media pads as disclosed herein are produced via additive manufacturing, for example via any additive manufacturing method and using any suitable material as disclosed herein. In some embodiments, media pads as disclosed herein may be produced via 3D printing.

3D printed media would allow for the elimination of glue, weld or bond lines. 3D printing would also easily allow for increased flexibility in the different configurations of hole shapes such that the media may in some embodiments not need to be slanted in order to drain liquid. In some embodiments, a media pad as disclosed herein may be produced using 3D printing and in a 6-sided honeycomb structure, which is an advantageous shape for maximizing surface area while minimizing the amount of material required to construct the media pad. One exemplary 6-sided honeycomb structure may be specified via biomimicry, i.e. modeling based on similar biological structures, for example honeycombs.

In some embodiments, 3D printing a media pad enables configurations with increased wettable surface area compared to existing media pads. In one embodiment, different sized media are improved by using CFD to size the holes and undulation of the holes through the media pad. In some embodiments, some or all holes may also be slanted through the media pad to allow for easier draining of the liquid down through the pad.

In one embodiment as disclosed herein, media pads are arranged so that maximum surface area is exposed for mass and/or heat transfer, and/or for filtration or purification effects for different media pad sizes and air or gas path configurations. Larger media pads may be made from material formed so it is both compressible and expandable to allow for ease of storage and transport and for expansion for use in the transfer of mass and heat, and filtration. In one embodiment, the media material is designed for flow of liquid desiccant or other fluid through a vertical or horizontal or other media structure. In one embodiment, the media material is designed for flow of a fluid via gravity. In one embodiment, media pads can be formed from the smallest to the largest of sizes in a continuous form, for example media pads may be printed to a custom size. Some media pads as disclosed herein may be 3D printed from a variety of materials. In some embodiments, media material is configured to have a rough surface which gives a greater surface area and adds beneficial turbulence to the air to promote more contact between the fluid and gas flowing past the media material.

Media pads may be configured with smaller holes and a higher concentration of convolutions allowing for a longer path for a droplet of fluid to travel with gravity, so there is a greater density of surface area increasing the transfer of heat and mass energy and filtration. In certain embodiments, smaller media pads may not necessarily be compressible, as the advantage of compressibility is diminished where pads are already small.

In one embodiment, a disclosed media pad may be configured with a six-sided honeycomb or similar arrangement of holes or cells in the media in order to enhance surface area. This shape is found in nature because of its efficiency and special effectiveness. The honeycomb shape, with the point at the top, allows for increased contact and draining of fluid through the media. This allows for the media to have generally horizontally oriented holes for gas to pass through. In some embodiments, the hexagonal shape may be tessellated so it efficiently fills the volume. Such structures use minimal material and energy and support increased weight. In some embodiments, the walls of the hexagons can all be of the same or similar thickness all around, while in other embodiments, one or more sides may be configured deliberately to be thicker or thinner than others. The hexagon shape also benefits from having a very large area for a given perimeter, a biomimetic design.

As disclosed herein, a media pad in a "horizontal" or "counter-flow" orientation is configured such that a fluid flows from top to bottom of the media pad, while a gas flows through one or more channel from the bottom to the top of the media pad, 180 degrees (or about 180 degrees, or slanted from 180 degrees) from the direction of the fluid flow. The channels in a media pad positioned in a horizontal orientation are configured such that they run from the top side of the media pad to the bottom side. A media pad in a "vertical" or "cross-flow" orientation is configured such that a fluid flows from top to bottom of the media pad, while a gas flows laterally through the channels in the media pad, in a direction 90 degrees (or about 90 degrees, or slanted from 90 degrees) different from the direction of the fluid flow. The channels in a media pad positioned in a vertical position are configured such that they run laterally, for example from a right side of the media pad to a left side of the media pad, or from a front of the media pad to the back of the media pad. As used herein, the term "slanted" refers to an angular deviation of between 0.5° and 10° , or between 0.5° and 8° , or between 0.5° and 6° , or between 0.5° and 5° , or between 0.5° and 3° , or between 0.5° and 2° , or between 0.5° and 1° from a perfectly horizontal or vertical orientation.

Some designs may include straight through holes through a media pad, which may be horizontal or vertical or slanted. In some embodiments, one or more holes may modulate side to side or up and down as they go through the media so that the air or gas is forced to have more contact with the media surface. Such wave-like undulation, which may in some embodiments be sinusoidal, need only be the height or width of the hole, side to side or up and back down a few times over the depth of the media. As used herein, the terms "undulation" or "wave-like undulation" refer to any continuous path (that is, without discontinuities or angles). Such configurations allow the front and in some cases the back of the media pad to have a hole-sized gap or surface at the top that may be used for attaching to a frame. This gap (for example gap 407 in FIG. 4A) could also be arranged at the bottom for attaching to the frame. In some embodiments, the gaps are configured to prevent air leakage or bypass. This shape also allows the media to be flattened or compressed to allow for easier storage and shipping of larger media pads.

Hexagonal, 6-sided honeycomb shapes have a low weight to stiffness ratio and a high stiffness to weight ratio which allows for ease of compression and expansion while retaining the shape and rigidity. In some embodiments, a compressible media may require a structural support to keep it in a fixed shape when expanded and wetted, particularly in larger pads. In some embodiments, a structural frame can be used to make a compressible media pad rigid when expanded. The rigid media pad may then be placed into a processing unit. In some embodiments, a vertical structural frame can be integrated to accept the spreading pad on top of the media and isolate the negative or positive pressure air stream from the neutral pressure in spray pipes positioned on top of or above the media. Such frames may also integrate a support for an isolation pad at the bottom of the media to isolate the negative pressure or positive pressure airstream from the neutral pressure in one or more collecting sumps.

In one embodiment, a box frame may be used as a support. A box frame may include hinges at the corners to allow it to be flattened for transport. Such a frame could be constructed from the same material as the media, including structural rods made of fiberglass or graphite or some other reinforcing element embedded in the sides and top and bottom to assure it retains its flat surfaces and structural integrity. The side to side or up and down undulation of the holes could make the front and back available for support fittings.

In some embodiments, a media pad may include a leading edge and/or a leaving edge having different characteristics than the remainder of the hole. For example, in some embodiments, one or both of a leading and a leaving edge may be thicker and created to be more resilient to wear. In some embodiments, one or both of a leading and a leaving edge may comprise a different material. In some embodiments, one or both of a leading and a leaving edge may comprise nanoparticles deposited on at least a portion of the edge.

In some embodiments, one or both of a leading and a leaving edge may comprise one or more ribbons of a different material, which may for example be stiffer than the remainder of the media pad.

In some embodiments, different sized holes are modeled to increase energy and filtration efficiencies for different applications and different physical media sizes.

In some embodiments, a media material is non-woven, wettable, microporous, and is able to be scalable in size. Some media materials can be configured with a fractal arrangement for optimum surface area for each size media pad. Some materials contemplated herein are able to tolerate maximum and minimum temperatures from −40° C. through to 120° C. (−40° F. through to 238° F.). In some embodiments, a media material is configured to tolerate temperatures from −20° C. to 80° C. (0° F. to 180° F.). In other embodiments, media materials may have a temperature tolerance of −40° C. to 120° C., or −40° C. to 100° C., or −20° C. to 100° C., or −20° C. to 80° C., or 0° C. to 100° C., or 0° C. to 80° C., or any other suitable range. In some embodiments, nanoparticles may be deposited on a surface of a media pad to enhance performance.

In some embodiments, media as disclosed herein do not have glue, weld or bond lines due for example to the method of manufacture (e.g. 3D printing). As such, holes within the media do not need to be slanted through the media depth to guide liquid to drain away from such areas. Media holes without glue or weld lines can be situated generally horizontally and the liquid will drain away by the force of gravity alone.

Figure 4A:
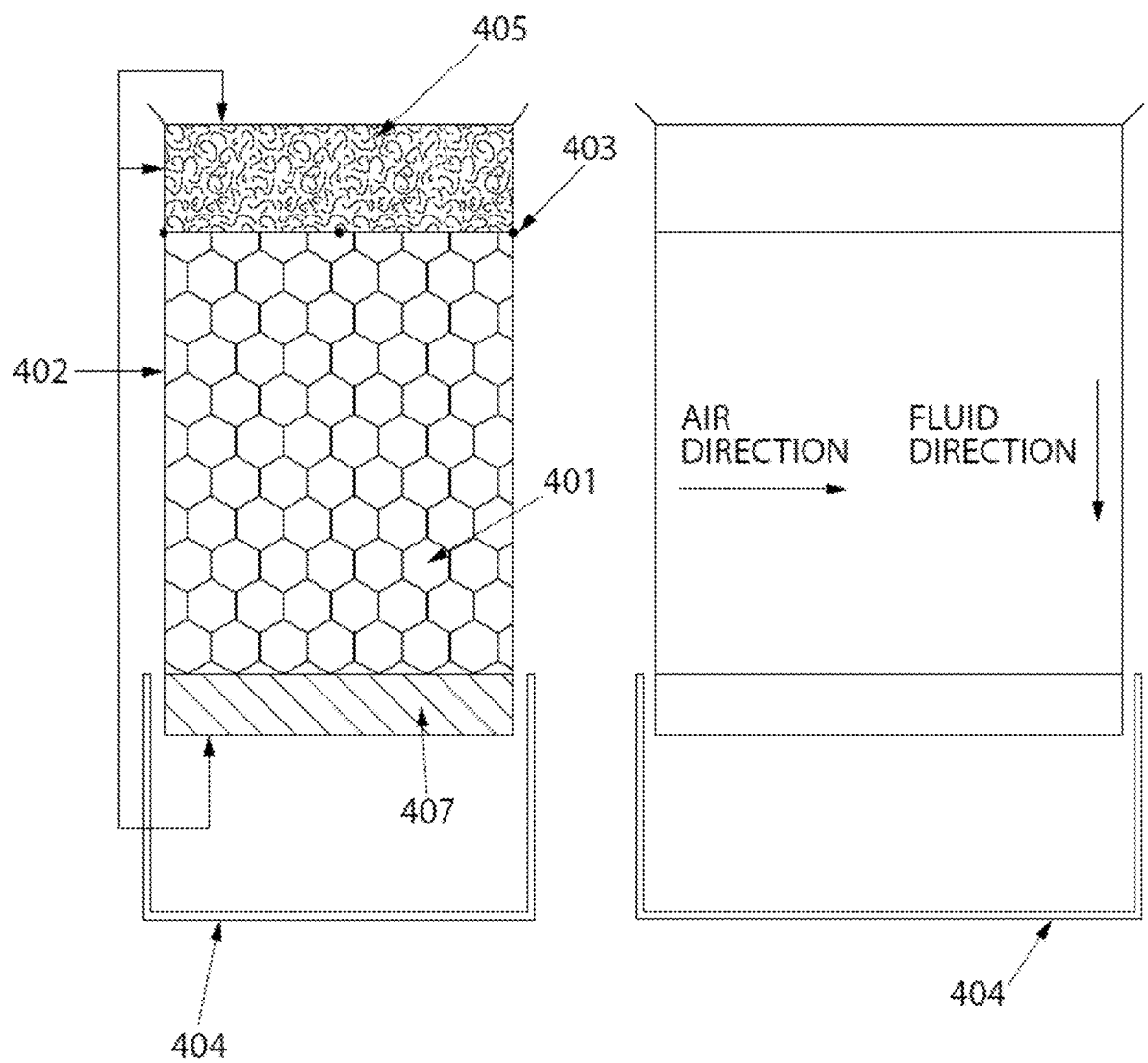
FIG. 4A is a side view of an exemplary media pad in a vertical orientation.

Referring now to FIG. 4A, an exemplary horizontal process system is shown in two views. The media pad 401 is shown in a frame 402 attached to the media pad with attachments 403. The liquid flows down from the spreader 405 through the media pad 401 and drains through gravity into the pressure equalizer 407 and then into the sump 404. The air or other gas goes through the media pad 401 in a direction perpendicular to the liquid (cross-flow), which may in some embodiments be brine. Spreader 405 may in some embodiments be a spreader pad, configured to direct or spread fluid laterally across the top surface of a media pad. Spreader 405 may comprise a sponge-like material. While FIG. 4A shows a spreader 405 only on the top surface of the media pad, in some embodiments a media pad may be further configured with a spreader on the bottom surface, in order to resist the flow of fluid going down through the media pad and also to prevent bypass of air or gas into the sump or below a bottom surface of the media pad. In some embodiments, a horizontal media pad (i.e., a media pad wherein the holes or channels run from the top to the bottom of the media pad) is configured with a frame supporting the media pad with supports on the underside of the media pad.

Figure 4B:
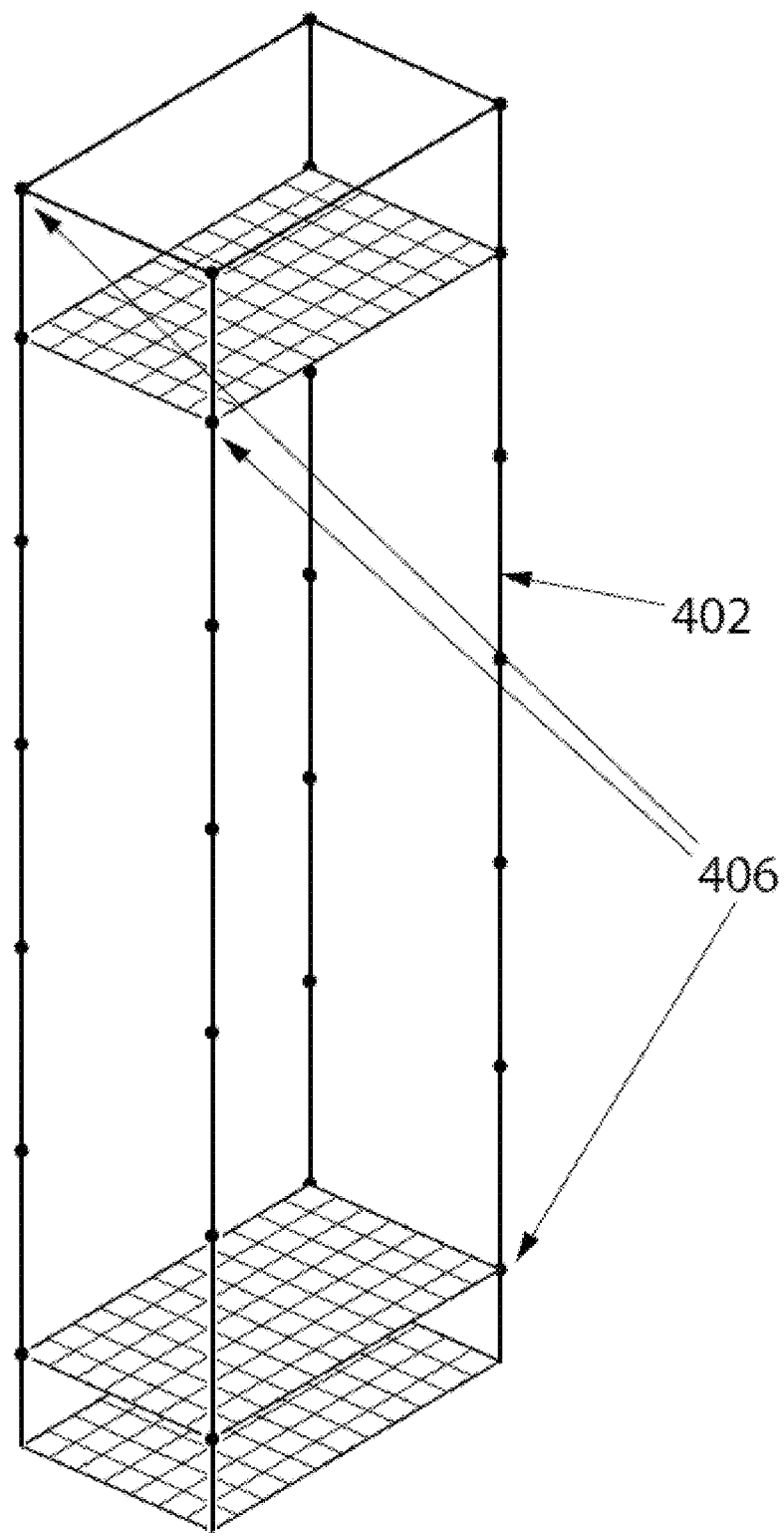
FIG. 4B is an exemplary frame for use with a media pad.

Referring now to FIG. 4B, an exemplary frame 402 is shown with one or more hinges 406 that allow the frame to be flattened for shipping and other purposes. In some embodiments, a frame may include hinges with a single degree of freedom that rotate about a single axis. In some embodiments, a frame may include hinges having two or three degrees of freedom, for example ball type hinges. In some embodiments, a frame may comprise interlocking rods with one or more strings or shock cords threaded through, similar to tent poles. In some embodiments, hinges 406 in frame 402 allow for the frame to be collapsed or flattened for easier transportation, packing, and shipping. In some embodiments, the frame may have a thickness of between 1 mm and 10 mm depending on the size and resistance of the processing unit.

Figure 5:
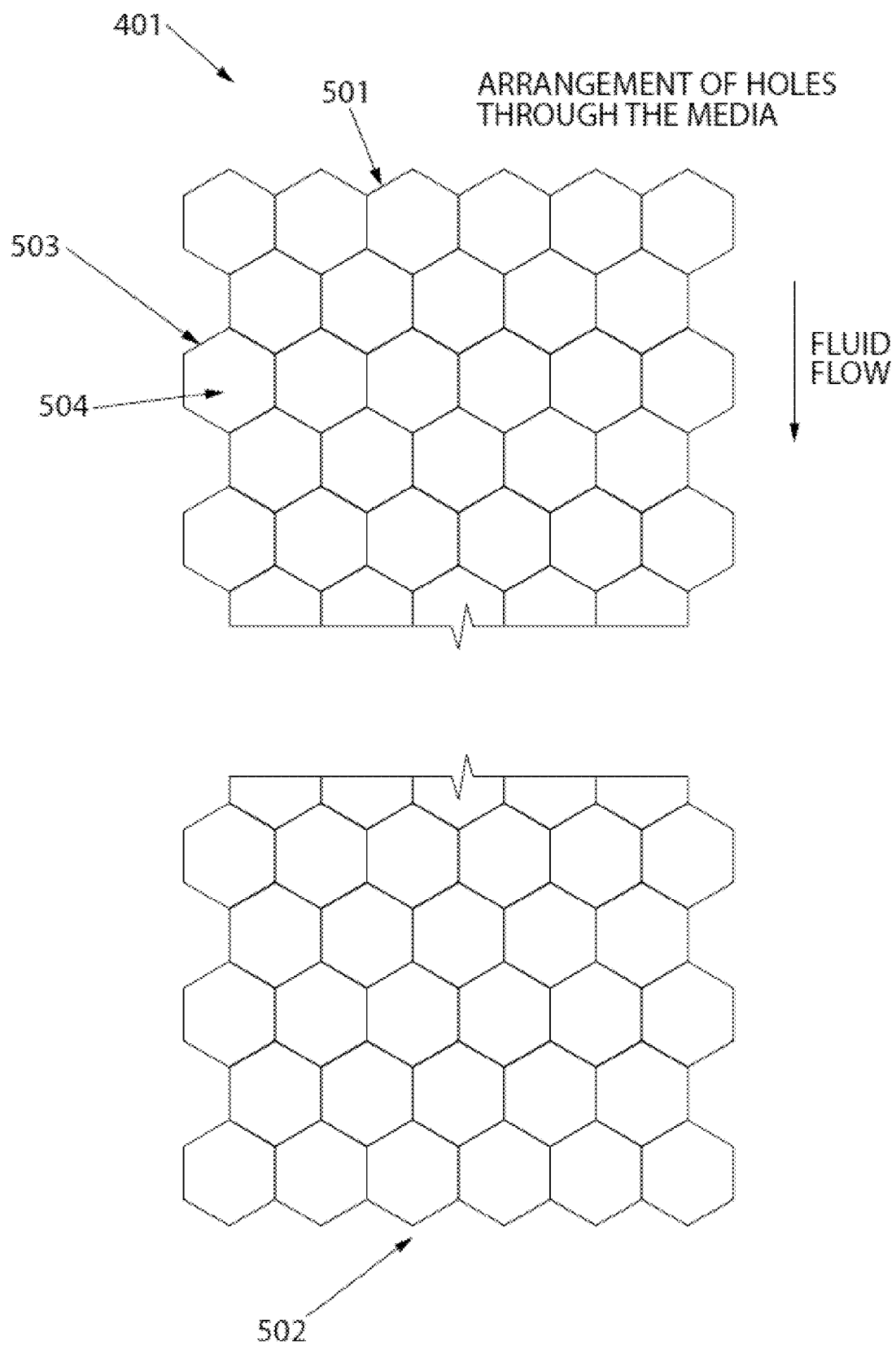
FIG. 5 is an exemplary arrangement of holes or channels in a media pad.

Referring now to FIG. 5, an exemplary arrangement of holes of a media pad 401 is shown in a regular hexagonal or honeycomb configuration. This configuration allows for optimizing the contact between the gas and the liquid. This embodiment also allows for compression and expansion of the media pad 401 width for ease of storage and transportation. In the embodiment shown in FIG. 5, a fluid, for example a liquid desiccant, flows from the top end 501 to the bottom end 502, following the walls 503 of individual hexagonal elements. Gas, for example air, flows in a direction orthogonal to the page, either into the page or out of the page, through the holes or channels 504 formed by the walls 503 of the hexagonal elements. While the gas flows through the holes or channels 504, it exchanges energy with the fluid as the fluid flows down the walls 503. In one example, a liquid desiccant flowing down the walls 503 of the hexagonal elements cools air flowing through the holes or channels 504 of the hexagonal elements.

Figure 6:
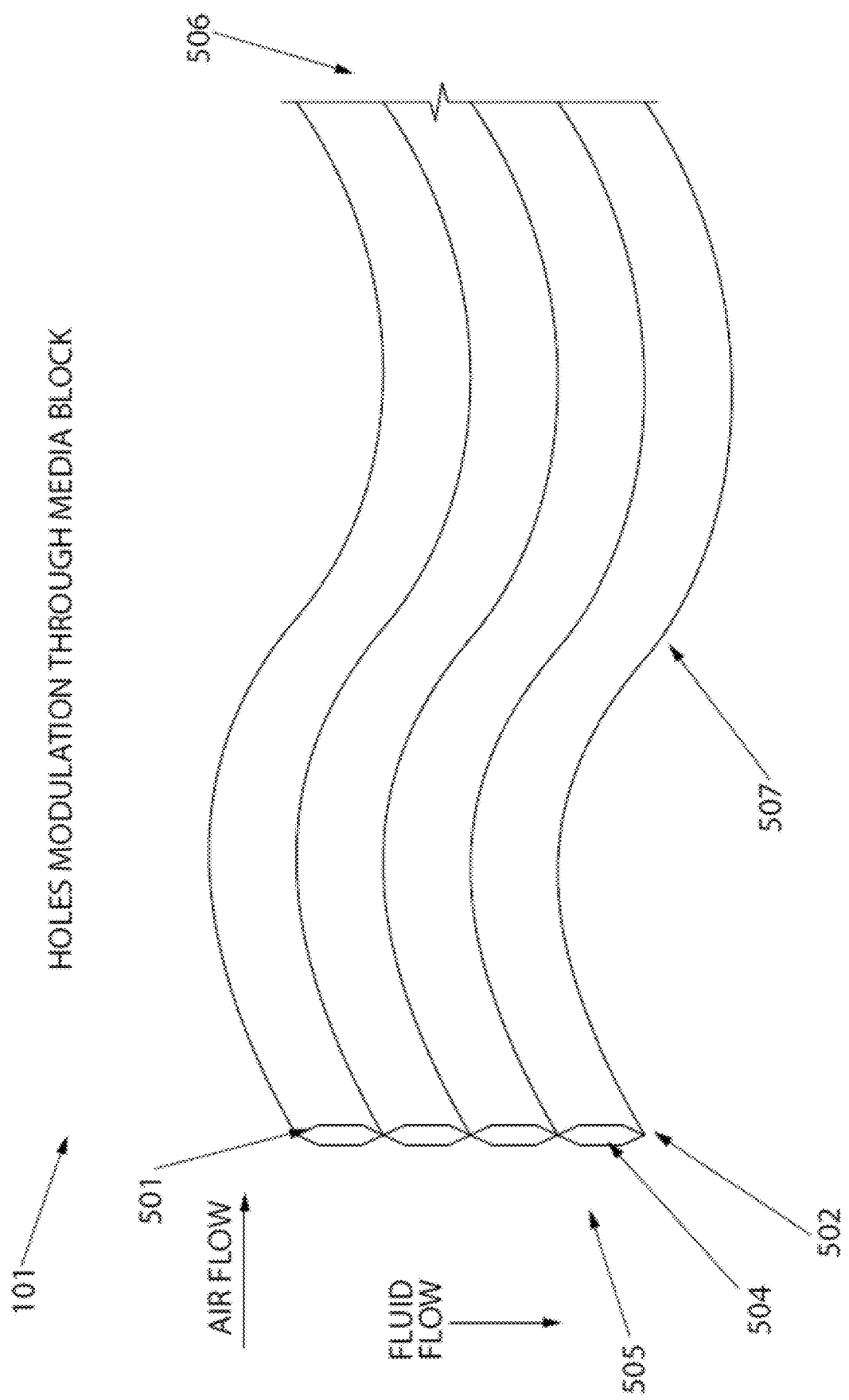
FIG. 6 is an exemplary view of different undulation patterns of channels in a media pad.

Referring now to FIG. 6, an exemplary arrangement of holes in a media pad is shown with an undulation pattern in the media pad 401. The embodiment of FIG. 6 is configured with a generally horizontal positioning of the holes or channels 504 in the media pad 401. This embodiment allows for a generally vertical or horizontal positioning of the media pad 401 in the system. When the media is in a horizontal position, there will be less need for a frame for horizontal support as the honeycomb has more structural capability in the generally horizontal position. A frame may be required to keep the media pad expanded and supported at various places throughout the media pad's four or six perimeter sides. In some embodiments where horizontally-oriented media pads are used, the spreader and collection area pressure isolation elements are not necessary.

The embodiment shown in FIG. 6 represents a 90 degree rotation of one embodiment of the view shown in FIG. 5. Where the airflow in FIG. 5 is into or out of the page, the airflow in FIG. 6 goes from an inlet end 505 toward an outlet end 506. After the air flows into inlet 504, the undulating design of the channels defined by the holes 504 provides increased turbulence, and increased contact between the air and a fluid flowing down the walls of the channels from a top end 501 to a bottom end 502 of the media pad 401. The undulating design shown includes curves 507, and in some embodiments the curves may be simple undulation, sinusoidal, parabolic, hyperbolic, elliptical, circular, spiral, or random. The channel may follow a path that undulates along one or two dimensions, for example along the vertical dimension and/or along a horizontal dimension. The channels or holes may also be oriented vertically or horizontally straight through, or slanted.

Another aspect of the invention relates to a method of design and manufacture of media pads utilized in systems which use fluid to condition one or more gases. In one embodiment, a media pad is 3D printed wherein there are no bond, weld or glue lines. The 3D printing method also in some embodiments enables custom design of the size and shape of the holes for specific uses.

In some embodiments, holes of a media pad are printed in a geometric pattern, for example a regular hexagonal 6-sided honeycomb pattern with all sides the same length and all interior angles the same. In some embodiments, the media pad is printed in an irregular hexagonal 6-sided honeycomb pattern wherein at least one side and/or at least one angle of the 6-sided honeycomb pattern is different from the others.

These hexagonal shapes, with 2 opposing points in a generally vertical orientation, allow for increased contact area and easier draining of the fluid when the pad is in a vertical position. The hexagonal shape also enables the media pads to be manufactured without a horizontal slant for draining the fluid from the pad, or with a horizontal slant as well as an undulation which may in some embodiments be a wave-like and/or sinusoidal undulation. The regular hexagon and honeycomb shape are recognized as an efficient biomimetic configuration.

Figure 7A:
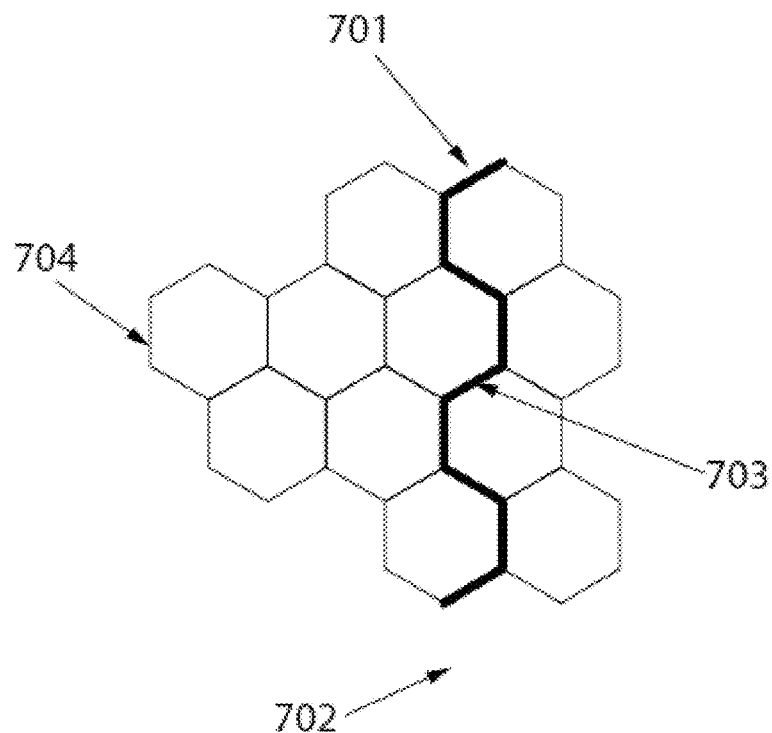
FIG. 7A is an exemplary view of a structural support element in a vertically oriented media pad.

In some embodiments, as discussed above, a media pad or method of making a media pad as disclosed herein may include one or more structural support elements built-in to the media pad, for example a thin ribbon of a stiff material built in to the media pad. An example of a support ribbon in two different configurations in shown in FIG. 7A and FIG. 7B. With reference to FIG. 7A, a partial view of a media pad in a vertical orientation is shown, in which fluid flows from the top end 701 of the pad to the bottom end 702 of the pad, with the pad comprising a set of tessellated hexagonal channels 704. In the example of FIG. 7A, a ribbon 703 of a second material is included in the pad running along the sides of several channels, to provide additional structural support for the pad and in order to prevent the media pad from compressing along the vertical axis. The ribbon may be positioned at the leading or leaving edge of the channels, or may be positioned internal to the pad, for example at a position along the channel in between the leading edge and the leaving edge of the pad.

Figure 7B:
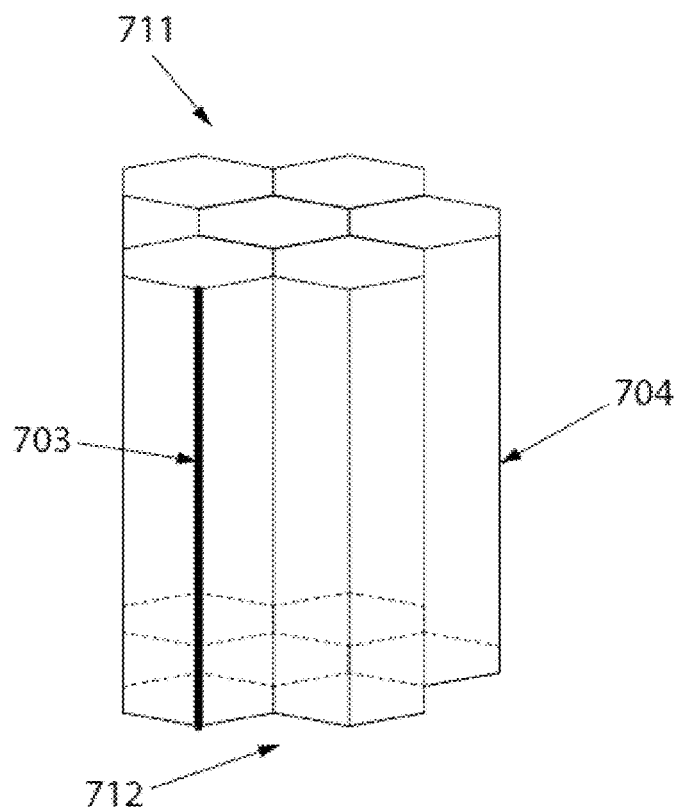
FIG. 7B is an exemplary view of a structural support element in a horizontally oriented media pad.

A second example is shown in FIG. 7B, with a media pad in a horizontal orientation, in which fluid flows from the top end 711 of the pad to the bottom end 712 of the pad, with the pad comprising a similar set of tessellated hexagonal channels 704. In this embodiment, a thin ribbon of a stiff material 703 is included in the pad along a corner of one of the hexagonal channels 704. In some embodiments, one or more vertical ribbons as in FIG. 7A may be used in conjunction with one or more horizontal ribbons as in FIG. 7B. A media pad may alternatively include only one type of these ribbons, horizontal or vertical. In some embodiments, one or more ribbons may also be a part of the honeycomb itself, for example as an altered ribbon of material created via a nano or quasi particle addition to change the structure of the ribbon, for example increasing its stiffness.

Figure 8:
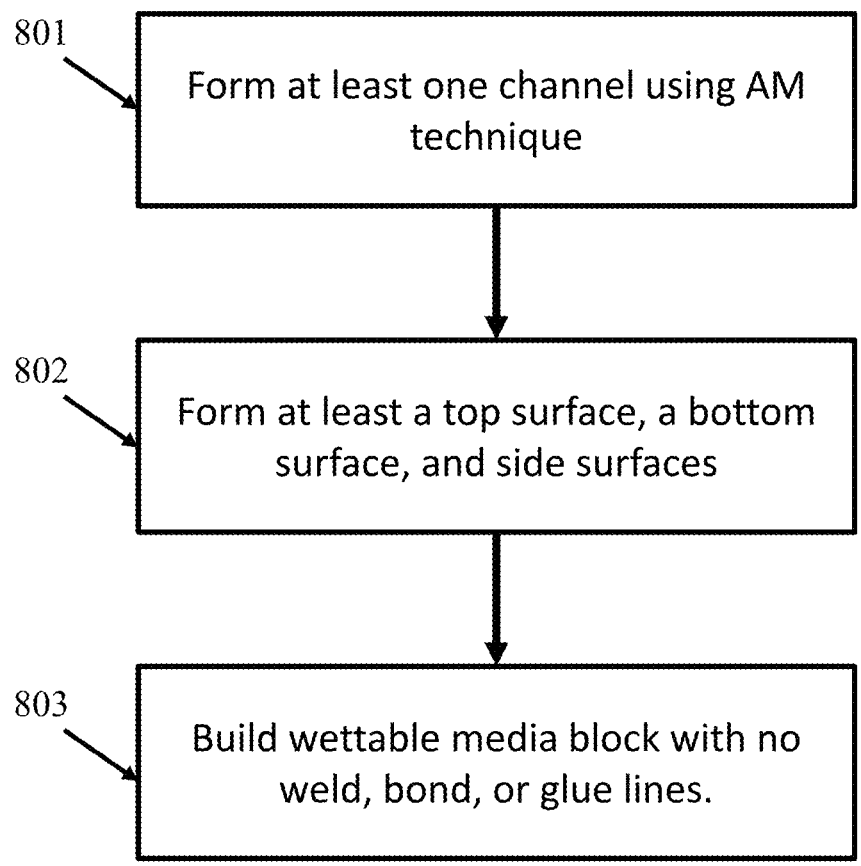
FIG. 8 is an exemplary method of making a media pad.

With reference to FIG. 8, a method 800 of forming a wettable media pad comprises forming at least one channel in the wettable media pad using an additive manufacturing (AM) technique in step 801, forming at least a top surface, a bottom surface, and side surfaces in step 802, and building the wettable media pad with no weld, bond, or glue lines in step 803. It is understood that although these steps are shown in FIG. 8 in a particular progression, in various embodiments the steps may be carried out in any suitable order and with any additional intermediate steps in between.

In some embodiments, a pad, and optionally a frame where required, may be designed and fabricated such that there is no air or gas bypassing the fluid-soaked media when installed into a gas processing machine.

In one aspect, the present disclosure includes various methods of compressing and expanding a media pad. In some embodiments, a media pad may be configured with holes which are modulated vertically to aid in creating further turbulence in the air and creating more surface area for the liquid to come in contact with the gas. Some embodiments of the media pad may be configured with holes which are modulated or undulated horizontally to aid in creating further turbulence in the air and creating more surface area for the liquid to come in contact with the gas. Some embodiments of the media pad may be formed with thicker edges, and/or may be configured to be more wear resistant. Some embodiments of the media pad are formed with thicker material where the attachments are positioned at the sides, top and bottom, or at the front and back of the pad where the air enters or exits. In some embodiments, the media pad may be formed to allow for a frame or other form of structural support to be incorporated.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A wettable media pad, comprising:
an inlet side and an outlet side, and
a porous three-dimensional unitary structure made from a non-woven material, comprising a plurality of channels having a hexagonal cross-section defined by six walls, the channels running from the inlet side to the outlet side;
wherein the wettable media pad is configured to direct fluid from a top surface of the media pad to a bottom surface of the media pad along at least one of the walls of the channels; and
wherein the wettable media pad is configured to exchange heat and mass between a fluid positioned on or in at least one of the walls of the channels and a gas flowing through the channels as the gas flows from the inlet side to the outlet side of the media pad.

2. The wettable media pad of claim 1, wherein the media pad is compressible and expandable.

3. The wettable media pad of claim 1, wherein the media pad is rigid.

4. The wettable media pad of claim 1, wherein the hexagonal cross-section has a shape of a regular hexagon.

5. The wettable media pad of claim 4, wherein the channel is arranged such that a corner of the regular hexagon cross-sectional shape is pointed toward the top surface of the media pad when in a vertical position.

6. The wettable media pad of claim 4, wherein at least a portion of the wettable media pad is configured as tessellated regular hexagons.

7. The wettable media pad of claim 1, wherein the hexagonal cross-section has a shape of an irregular hexagon.

8. The wettable media pad of claim 7, wherein the channel is arranged such that a corner of the irregular hexagon cross-sectional shape is pointed toward the top surface of the media pad when in a vertical position.

9. The wettable media pad of claim 7, wherein at least a portion of the wettable media pad is configured as tessellated irregular hexagons.

10. The wettable media pad of claim 1, wherein at least one channel of the plurality of channels runs parallel to the top surface of the media pad.

11. The wettable media pad of claim 1, wherein at least one channel of the plurality of channels is not parallel to the top surface of the media pad.

12. The wettable media pad of claim 1, wherein the walls have a same thickness.

13. The wettable media pad of claim 1, wherein at least one of the walls has a thickness that is different from a thickness of at least one other wall of the six walls.

14. The wettable media pad of claim 1, wherein at least two of the six walls have a thickness that is different from at least one other wall of the six walls.

15. A wettable media pad, comprising:
an inlet side and an outlet side, and
a porous structure made from a non-woven material, comprising a plurality of channels having a hexagonal cross-section defined by six walls, the channels running from the inlet side to the outlet side;
wherein the wettable media pad is configured to direct fluid from a top surface of the media pad to a bottom surface of the media pad along at least one of the walls of the channels; and
wherein the wettable media pad is configured to exchange heat and mass between a fluid positioned on or in at least one of the walls of the channels and a gas flowing through the channels as the gas flows from the inlet side to the outlet side of the media pad;
wherein at least one surface of the media pad comprises nanoparticles or quasiparticles.

16. A wettable media pad, comprising:
an inlet side and an outlet side, and
a porous structure made from a non-woven material, comprising a plurality of channels having a hexagonal cross-section defined by six walls, the channels running from the inlet side to the outlet side; and
at least one ribbon of a second material running from a first surface of the media pad to a second surface of the media pad, configured to stiffen the media pad along an axis defined by the ribbon;
wherein the wettable media pad is configured to direct fluid from a top surface of the media pad to a bottom surface of the media pad along at least one of the walls of the channels; and
wherein the wettable media pad is configured to exchange heat and mass between a fluid positioned on or in at least one of the walls of the channels and a gas flowing through the channels as the gas flows from the inlet side to the outlet side of the media pad.

17. A wettable media pad, comprising:
an inlet side and an outlet side, and
a porous structure made from a non-woven material, comprising a plurality of channels having a hexagonal cross-section defined by six walls, the channels running from the inlet side to the outlet side;
wherein the wettable media pad is configured to direct fluid from a top surface of the media pad to a bottom surface of the media pad along at least one of the walls of the channels;
wherein the wettable media pad is configured to exchange heat and mass between a fluid positioned on or in at least one of the walls of the channels and a gas flowing through the channels as the gas flows from the inlet side to the outlet side of the media pad; and
wherein at least one channel of the plurality of channels is structured with an undulation along an axis as the at least one channel runs from the inlet side to the outlet side.

* * * * *